April 17, 1956  S. F. McPHAIL  2,742,044
GRAIN SAVING DEVICES
Filed Sept. 25, 1952
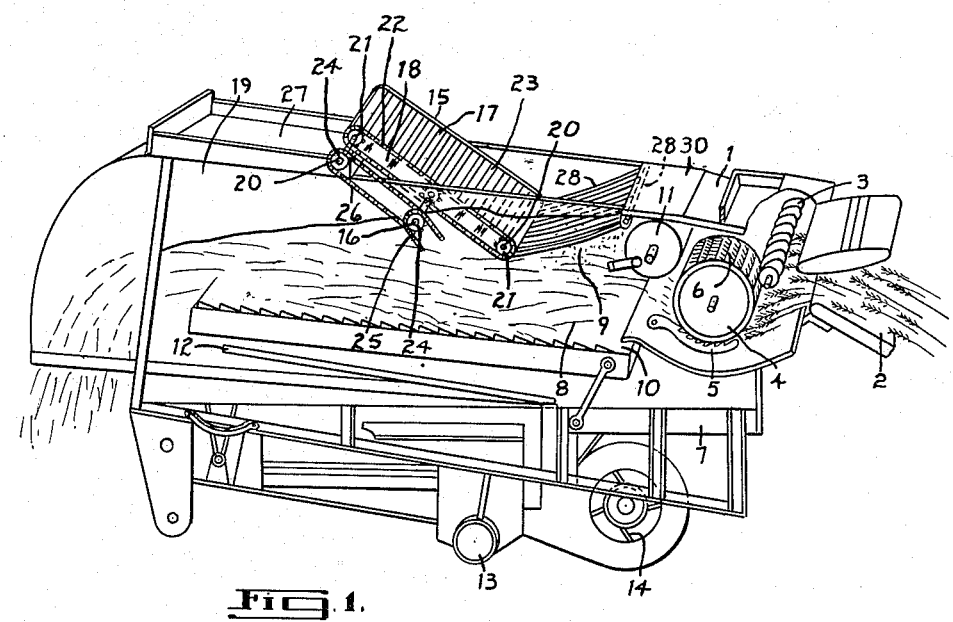
Fig. 1.
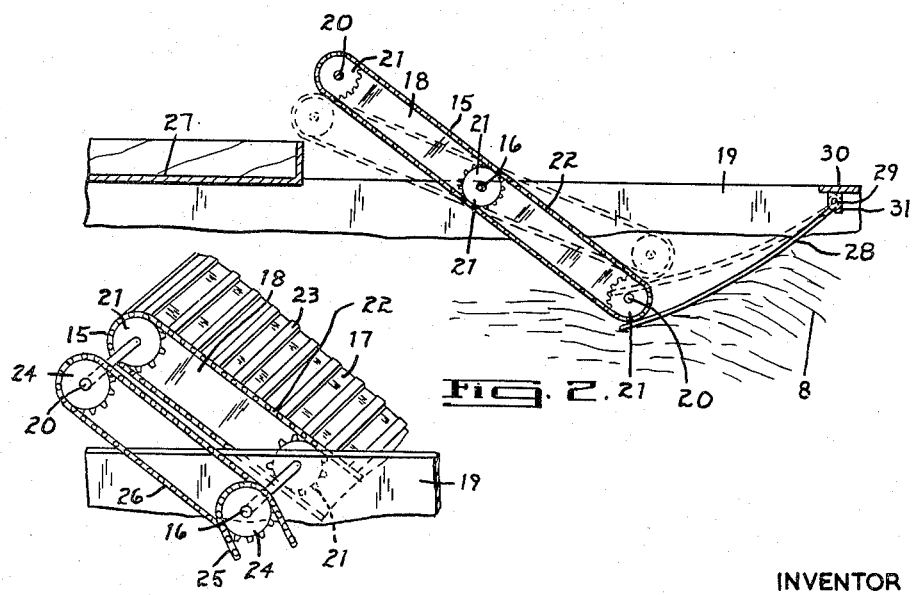
Fig. 2.
Fig. 3.
INVENTOR
Silas F. McPhail
By Douglas S. Johnson
ATTY.

United States Patent Office 2,742,044
Patented Apr. 17, 1956

2,742,044

GRAIN SAVING DEVICES

Silas F. McPhail, Riverside, Ontario, Canada

Application September 25, 1952, Serial No. 311,427

1 Claim. (Cl. 130—27)

This invention relates to improvements in grain saving devices to be used with combines, separators, threshing machines or other machines wherein the grain is separated from the straw by a threshing cylinder or the like.

In my previous United States Patent 2,581,198, I have shown how to separate the loose grain thrown out with the straw by the threshing cylinder towards the straw deck by means of a deflector unit located on the straw deck of the machine relative to the stream of flying grain and straw to deflect the grain clear of the straw for recovery.

In certain instances, particularly where the straw is damp, the presence of the deflector may cause choking of the straw feed along the straw deck. In such cases the output of the machine may be lowered or in severe cases the machine may have to be stopped and the straw deck cleared.

It is the object of this invention to provide a grain-deflecting and separating arrangement which will automatically enable the straw deck to clear itself of any build-up or matting of straw, whether dry or wet, to eliminate choking of the machine.

Another object is to incorporate with the deflector arrangement a means of ensuring that the small grain particles and the straw particles follow different trajectories.

Another object is to ensure continuous clearing of the separated grain from the deflector assembly.

The principal feature of the invention resides in pivotally mounting a deflector assembly to swing between a position projecting between the path of the small relatively heavy grain particles and the lighter straw thrown out by the cylinder and beater and an out-of-the-way position clear of any build-up of straw on the straw deck.

A further important feature resides in pivotally supporting an arrangement of tines in advance of the deflector assembly to screen out any high-flying lengths of straw.

In particular, to facilitate movement of the deflector assembly to clear the straw deck, another feature resides in arching the tines rearwardly of the cylinder to project beneath the deflector assembly and to engage and pivot same to the out-of-the-way position upon pressure of a build-up of straw against the tines.

Still a further feature resides in incorporating an endless carrier device in the deflector assembly to continually clear same of the grain separated out thereby.

Referring to the accompanying drawings, Figure 1 is a perspective view illustrating the application of my invention as used with a combine.

Figure 2 is an enlarged vertical sectional detail of the device illustrated in Figure 1 illustrating its operation to permit the passage of a build-up of straw therebeneath.

Figure 3 is a fragmentary enlarged perspective detail illustrating the drive for the deflector carrier.

As is understood in present machines, such as combines, threshing machines, and the like, the grain is fed to a cylinder with which co-operates a concave grating to effect shredding of the straw from the grain which then drops through the concave to a collector or grain pan. The shredded straw in turn is thrown out by the centrifugal action of the threshing cylinder onto the straw deck.

As has been pointed out in my United States Patent 2,581,198, a certain percentage of the grain is trapped in a discharge straw mat, which is carried to the straw deck. As has been pointed out, the grain which passes through the concave actually separates from the straw mat as it is thrown outwardly by the cylinder due to the fact that the air resistance offered to the grain is relatively small as compared to the air resistance presented to the straw. In the path of travel a substantial part of the grain is therefore above and beyond the path of travel of the straw as it flys through the air to the straw deck.

The separator device as disclosed in my said patent forms an effective means of separating out these two gravity-separated flying streams.

However with the deflector fixed in place there are certain instances, particularly when the straw is green or damp, where a build-up of straw occurs and the present deflector plate forms a barrier which is apt to lead to choking of the machine under these conditions.

The present invention provides for a machine which will be self-clearing in the event there is any build-up of the straw mat yet will automatically effect the grain separation as soon as the build-up has been cleared from the machine.

Referring to the drawings, Figure 1 shows a portion of a combine or threshing machine 1 provided with a grain feed 2 and a worm 3 to feed the grain to the threshing cylinder 4 with which co-operates the adjustable concave 5. The threshing cylinder is provided with the usual peripheral rasp bars 6 which cooperate with the concave to effect a shredding of the straw of the grain to effect a separation of the major portion thereof, which grain is dropped through the concave to the grain pan 7.

The straw 8 and the grain particles 9 trapped in passing through the concave by the straw mat are thrown out by the threshing cylinder 4 towards the reciprocally mounted straw deck 10, the out-passing stream of straw and grain from the threshing cylinder being agitated and broken up by the rotating beater 11.

Arranged below the straw deck is a grain return 12 to return any grain shaken through the straw deck to the grain pan as in the usual machine. Suitable pans and guards are provided to conduct the grain to the discharge 13 and the usual fan 14 is provided to blow off any loose straw particles from the grain prior to its discharge.

As such constructions are old in the art of threshing machines and combines and the like and as the details and arrangements of the parts vary from machine-to-machine and form no part of the present invention, no further detailed showing of such parts is deemed required.

The deflector device according to the present invention comprises an endless carrier 15 pivoted intermediate its length on an axis 16 extending transversely of and above the straw deck 10. The carrier comprises a frame presenting a transverse deflecting surface 17 extending substantially from side-to-side of the straw deck and downturned side flanges 18 through which the central shaft forming the pivot axis 16 extends to support the device from the walls 19 of the machine.

At each end of the flanges 18 are journalled shafts 20 and the central shaft 16 of the shafts 20 all carry sprockets 21 which engage endless chains 22 at each side of the deflecting surface 17, and extending between these endless chains are transverse bar elements 23.

The shaft 16 and the upper shaft 20 carry additional drive sprockets 24 and endless chains 25 and 26 connect the carrier to any power take-off available on the machine to operate the carrier through the upper shaft 20 whereby the bar limits 23 are drawn over the transverse surface 17 to clear grain particles landing thereon.

A pan 27 is provided adjacent the upper end of the carrier to receive grain particles discharged therefrom.

As the connection for the drive of the carrier will vary from machine to machine and the manner of its connection is obvious, no specific take-off is illustrated.

The deflecting surface 17 is of such a length and its pivot axis 16 is so disposed that in its inclined position shown in solid line Figure 2 it extends in a direction generally radially of the cylinder 4 and is adapted to enter between the gravity separated flying streams of straw 8 and grain 9. These grain particles 9 landing on the deflector or separator surface 17 are prevented from returning to the straw deck by the bar elements 23 which sweep the grain to the upper end of the carrier and into the pan 27.

While the larger pieces of the straw will fall almost immediately after leaving the cylinder or beater there is still a certain amount of straw that may tend to approximate the path of the grain. To eliminate this small percentage of straw from reaching the surface 17 a plurality of tines 28 are pivotally supported by their axis 29 extending transversely of the straw deck adjacent the roof 30 of the machine.

These tines extend downwardly and away from the cylinder 4 to lie beneath the lower end of the carrier device 15. A stop bar 31 limits movement of these tines toward the cylinder to the position of Figure 2 and in this position the limit of the downward movement of the lower end of the carrier 15 is determined.

As will be seen in Figure 2, when a build-up of straw occurs, this build-up of straw, which would choke the machine if the carrier device 15 were stationary, presses against the tines 28 forcing them upwardly. The tines in turn swing the carrier device 15 upwardly to the dotted line position towards the horizontal to clear a path for the straw build-up through the machine.

As soon as the pressure of straw against the tines 28 are relieved they and the carrier will return to the solid line position of Figure 2 under their own weight.

It will be appreciated that the tines may be made light or may be counterbalanced as may be desired, and so too the carrier may be counterbalanced so that a relatively light pressure will effect upward movement to relieve the congested or choking condition of the machine.

It will be appreciated that a separating unit according to the invention may be readily installed in all types of existing machinery, and it will be appreciated that variations in the form and construction of the device to adapt the invention to particular machines or particular situations may be made without departing from the scope of the invention.

What I claim as my invention is:

In a threshing machine or the like including a straw deck and a threshing cylinder adapted to discharge gravity separated streams of straw and grain towards the straw deck with the grain flying above the straw, a longitudinal relatively thin deflector device comprising an endless conveyor operating longitudinally of said straw deck, and transverse projections carried by said conveyor to retain grain particles thereon with said device in inclined grain separating position, said deflector device being pivoted intermediately of its length above said straw deck on an axis transverse thereof to swing between a normal position inclined to the straw deck and a position generally parallel to the straw, said deflector when swung to said normal inclined position extending generally radially of said cylinder with the lower end of said deflector disposed nearest the cylinder but displaced therefrom in the direction of said straw deck and entering between said gravity separated grain and straw streams, a plurality of tines pivoted above said straw deck on an axis transverse said straw deck between said deflector device and said cylinder, said tines projecting downwardly into the path of flying straw in advance of said deflector device and below the lower end of said deflector, said tines and deflector unit being free to swing upwardly to allow a build-up of straw on said straw deck to pass therebeneath.

References Cited in the file of this patent

UNITED STATES PATENTS

| 513,089 | Crockett | Jan. 23, 1894 |
| 762,639 | Kramer | June 14, 1904 |
| 1,728,076 | Olney | Sept. 10, 1929 |
| 1,864,033 | Wettlaufer | June 21, 1932 |

FOREIGN PATENTS

| 428,286 | Germany | Apr. 28, 1926 |